Patented July 30, 1940

2,209,943

UNITED STATES PATENT OFFICE 2,209,943

UREA-FORMALDEHYDE MOLDING COMPOSITION AND METHOD OF PRODUCING SAME

Leonard Smidth, New York, N. Y., assignor to Luco Products Corporation, Brooklyn, N. Y., a corporation of Delaware No Drawing. Application January 22, 1930, Serial No. 422,544

10 Claims. (Cl. 260—69)

In preparing molding compositions from urea and formaldehyde which quickly "set" when placed in a mold and subjected to the combined action of heat and pressure, trouble is experienced because of the lack of "flow" of the composition when the pressure is applied thereto. This lack of "flow" in the mold is usually caused by the reaction in the composition having progressed too far before the composition is placed in the mold, i. e., the composition is partially "set" and does not readily take the shape of the mold.

I have discovered that by adding thiourea or urea preferably thiourea to the composition before it is placed in the mold the "flow" of the composition will be increased when the composition is subjected to the combined action of heat and pressure in the mold.

In practice, the thiourea or urea in its crystalline form is preferably pulverized and then added to the molded composition in its pulverized form. The molding composition with its added thiourea or urea is then thoroughly mixed to form a homogeneous mass before it is placed in the mold. I have found that if the thiourea or urea is not thoroughly pulverized and mixed with the molding composition, the molded product tends to be "spotty."

The proportion of thiourea or urea to the molding composition may vary within quite wide limits but should be less than 10% (ten percent) by weight of the molding composition and should, preferably, be in excess of that which would react with the formaldehyde present in the composition so that there will be free thiourea or urea present in the molding composition.

For example, a urea-formaldehyde molding composition was produced according to my copending application #363,397, filed May 15th, 1929, as follows: 100 g. of urea was reacted by boiling with 200 cc. of 40% formaldehyde solution neutralized with ammonium hydroxide. The pH of the solution after boiling was 6.0. This was then mixed with 80 g. of powdered paper pulp. The mixture was dried and pulverized.

What I claim is:

1. A dry molding composition comprising a mixture of a dried urea-formaldehyde condensation product and a substance from the group consisting of urea and thiourea in unreacted condition.

2. A dry molding composition comprising a mixture of a dried urea-formaldehyde condensation product and less than 10% of a substance from the group consisting of urea and thiourea in unreacted condition.

3. A dry urea-formaldehyde molding composition plasticized by an admixture of a substance from the group consisting of urea and thiourea in the dried composition.

4. A molding powder comprising a dry mixture of a urea-formaldehyde condensation product and a minor amount of dry, pulverized thiourea.

5. A molding powder comprising a dry mixture of a urea-formaldehyde condensation product and a minor amount of dry, pulverized urea.

6. A molding powder comprising a dry mixture of a urea-formaldehyde condensation product and a minor amount of a dry, pulverized urea compound, adapted to increase the flow of the condensation product during the molding operation.

7. A dried molding composition capable of flowing during molding under heat and pressure comprising a mixture of a urea-formaldehyde condensation product lacking in flowing properties with a minor quantity of a free urea compound distributed therein which imparts flowing characteristics to the composition.

8. A quick-setting, dry, flowable molding composition comprising a dry urea-formaldehyde condensation product having distributed therethrough a dry, finely divided urea compound in unreacted condition.

9. In the production of dried molding compositions, the process of increasing the flow of dried urea-formaldehyde condensation products which comprises, thoroughly mixing a urea compound with the condensation product thereby providing a dry flowable molding composition containing the urea compound in a free state uniformly distributed therethrough.

10. In the production of dried molding compositions composed of urea-formaldehyde condensation products, the process of increasing the flow of the composition which comprises, thoroughly incorporating in said composition less than 10% of a dry urea compound, the quantity of said compound being in excess of that which reacts with formaldehyde in the composition, whereby there is produced a dry molding composition having uniformly distributed therethrough a finely divided urea compound in the free or unreacted state.

LEONARD SMIDTH.

CERTIFICATE OF CORRECTION.

Patent No. 2,209,943.                        July 30, 1940.

LEONARD SMIDTH.

It is hereby certified that error appears in the printed specification of the above numbered patent requiring correction as follows: First column, line 44, after "pulverized." insert the following paragraphs -

When the above molding composition was placed in a given hot mold and subjected to a given pressure without the addition of free urea it required thirty seconds to close the mold.

When 100 g. of the said molding composition was thoroughly ground with 5 g. of urea this composition was placed in the same mold under the same conditions and it required only eight seconds to close the mold.

It should be understood that where I use the terms urea and thiourea herein I intend to include their equivalents and derivatives.

and that the said Letters Patent should be read with this correction therein that the same may conform to the record of the case in the Patent Office.

Signed and sealed this 13th day of May, A. D. 1941.

Henry Van Arsdale, (Seal)                             Acting Commissioner of Patents.